(12) United States Patent
Jacob et al.

(10) Patent No.: US 10,547,670 B2
(45) Date of Patent: *Jan. 28, 2020

(54) SYSTEMS AND METHODS FOR SEAMLESS HOST MIGRATION

(71) Applicant: SONY INTERACTIVE ENTERTAINMENT AMERICA LLC, San Mateo, CA (US)

(72) Inventors: Mark Lester Jacob, San Diego, CA (US); Ronald Joseph Roy, San Diego, CA (US); Adam Pierce Harris, San Diego, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/048,065

(22) Filed: Jul. 27, 2018

(65) Prior Publication Data

US 2018/0337979 A1 Nov. 22, 2018

Related U.S. Application Data

(63) Continuation of application No. 15/672,113, filed on Aug. 8, 2017, now Pat. No. 10,063,631, which is a (Continued)

(51) Int. Cl.
*H04L 29/08* (2006.01)
*H04L 12/26* (2006.01)
(Continued)

(52) U.S. Cl.
CPC ............ *H04L 67/10* (2013.01); *H04L 43/10* (2013.01); *H04L 67/1002* (2013.01);
(Continued)

(58) Field of Classification Search
CPC . H04L 67/10; H04L 67/1053; H04L 67/1093; H04L 67/104; H04L 69/24;
(Continued)

(56) References Cited

U.S. PATENT DOCUMENTS

| 5,630,757 A | 5/1997 | Gagin et al. |
| 5,634,129 A | 5/1997 | Dickinson |

(Continued)

FOREIGN PATENT DOCUMENTS

| CN | 104069637 A | 10/2014 |
| EP | 1125617 | 8/2001 |

(Continued)

OTHER PUBLICATIONS

"Brief for Appellee," in re Masayuki Chatani et al., U.S. Court of Appeals for the Federal Circuit (2007-1150) (May 21, 2007).

(Continued)

*Primary Examiner* — Patrice L Winder
(74) *Attorney, Agent, or Firm* — Polsinelli LLP

(57) ABSTRACT

Systems and methods of the present invention for maintaining network data distribution are provided. Network data may be distributed in such as manner as to allow a network session to weather interrupted communications between host and clients without significant loss of data. Embodiments of the present invention provide for one or more clients to serve as backup host(s) for the network session. When the other clients transmit data to the host, they may also transmit the data to one or more backup hosts if there are any indications of interrupted communication.

19 Claims, 4 Drawing Sheets

Related U.S. Application Data continuation of application No. 14/637,182, filed on Mar. 3, 2015, now Pat. No. 9,729,621, which is a continuation of application No. 13/412,361, filed on Mar. 5, 2012, now Pat. No. 8,972,548, which is a continuation of application No. 12/049,954, filed on Mar. 17, 2008, now Pat. No. 8,131,802.

(60) Provisional application No. 60/997,918, filed on Oct. 5, 2007.

(51) Int. Cl.
H04L 29/06 (2006.01)
H04L 29/14 (2006.01)

(52) U.S. Cl.
CPC ........ *H04L 67/104* (2013.01); *H04L 67/1034* (2013.01); *H04L 67/1053* (2013.01); *H04L 67/1076* (2013.01); *H04L 67/1091* (2013.01); *H04L 67/1093* (2013.01); *H04L 67/42* (2013.01); *H04L 69/24* (2013.01); *H04L 69/40* (2013.01); *A63F 2300/408* (2013.01); *A63F 2300/535* (2013.01); *H04L 43/0811* (2013.01); *H04L 67/12* (2013.01); *H04L 67/303* (2013.01)

(58) Field of Classification Search
CPC ..... H04L 43/10; H04L 67/12; H04L 43/0811; H04L 67/1002; H04L 67/1034; H04L 67/1076; H04L 67/1091; H04L 67/42; H04L 67/303; H04L 69/40; A63F 2300/535; A63F 2300/408
See application file for complete search history.

(56) References Cited

U.S. PATENT DOCUMENTS

| | | | |
|---|---|---|---|
| 5,682,139 A | 10/1997 | Pradeep | |
| 5,704,032 A | 11/1997 | Badovinatz et al. | |
| 5,823,879 A | 10/1998 | Goldberg | |
| 5,826,085 A | 10/1998 | Bennet | |
| 5,838,909 A | 11/1998 | Roy et al. | |
| 5,841,980 A | 11/1998 | Waters et al. | |
| 5,862,339 A * | 1/1999 | Bonnaure | H04L 12/2856 709/217 |
| 5,893,106 A | 4/1999 | Brobst et al. | |
| 5,941,947 A | 8/1999 | Brown | |
| 5,956,485 A | 9/1999 | Perlman | |
| 5,984,787 A | 11/1999 | Redpath | |
| 5,987,376 A | 11/1999 | Olson et al. | |
| 6,041,312 A | 3/2000 | Bickerton et al. | |
| 6,050,898 A | 4/2000 | Vange | |
| 6,098,091 A | 8/2000 | Kisor | |
| 6,106,569 A | 8/2000 | Bohrer | |
| 6,108,569 A | 8/2000 | Shen | |
| 6,142,472 A | 11/2000 | Kliebisch | |
| 6,151,632 A | 11/2000 | Chaddha et al. | |
| 6,152,824 A | 11/2000 | Rothschild et al. | |
| 6,154,782 A | 11/2000 | Kawaguchi et al. | |
| 6,203,433 B1 | 3/2001 | Kume | |
| 6,219,045 B1 | 4/2001 | Leahy et al. | |
| 6,247,017 B1 | 6/2001 | Martin | |
| 6,311,209 B1 | 10/2001 | Olson et al. | |
| 6,345,297 B1 | 2/2002 | Grimm | |
| 6,352,479 B1 | 3/2002 | Sparks | |
| 6,363,416 B1 | 3/2002 | Naeimi | |
| 6,446,113 B1 | 9/2002 | Ozzie et al. | |
| 6,470,022 B1 | 10/2002 | Rochberger | |
| 6,487,583 B1 | 11/2002 | Harvey | |
| 6,487,678 B1 | 11/2002 | Briskey et al. | |
| 6,519,629 B2 | 2/2003 | Harvey | |
| 6,530,840 B1 | 3/2003 | Cuomo | |
| 6,539,494 B1 | 3/2003 | Abramson et al. | |
| 6,549,946 B1 | 4/2003 | Fisher | |
| 6,560,636 B2 | 5/2003 | Cohen et al. | |
| 6,561,811 B2 | 5/2003 | Rapoza et al. | |
| 6,577,628 B1 | 6/2003 | Hejza | |
| 6,587,874 B1 | 7/2003 | Golla | |
| 6,607,444 B2 | 8/2003 | Takahashi et al. | |
| 6,631,412 B1 | 10/2003 | Glasser et al. | |
| 6,654,831 B1 | 11/2003 | Otterness et al. | |
| 6,676,521 B1 | 1/2004 | La Mura et al. | |
| 6,704,885 B1 | 3/2004 | Salas-Meza et al. | |
| 6,748,420 B1 | 6/2004 | Quatrano et al. | |
| 6,755,743 B1 | 6/2004 | Yamashita et al. | |
| 6,761,636 B2 | 7/2004 | Chung et al. | |
| 6,763,371 B1 | 7/2004 | Jandel | |
| 6,769,990 B2 | 8/2004 | Cohen | |
| 6,799,255 B1 | 9/2004 | Blumenau | |
| 6,839,435 B1 | 1/2005 | Lijima et al. | |
| 6,844,893 B1 | 1/2005 | Miller et al. | |
| 6,931,446 B1 | 8/2005 | Cox et al. | |
| 7,003,550 B1 | 2/2006 | Cleasby et al. | |
| 7,016,942 B1 | 3/2006 | Odom | |
| 7,018,295 B2 | 3/2006 | Sakaguchi et al. | |
| 7,025,675 B2 | 4/2006 | Fogel | |
| 7,035,919 B1 | 4/2006 | Lee et al. | |
| 7,056,217 B1 | 6/2006 | Pelkey et al. | |
| 7,089,301 B1 | 8/2006 | Labio et al. | |
| 7,107,312 B2 | 9/2006 | Hackbarth et al. | |
| 7,155,515 B1 * | 12/2006 | Brown | H04L 67/1008 709/226 |
| 7,165,107 B2 | 1/2007 | Pouyoul et al. | |
| 7,177,950 B2 | 2/2007 | Narayan et al. | |
| 7,188,145 B2 | 3/2007 | Lowery et al. | |
| 7,203,755 B2 | 4/2007 | Zhu et al. | |
| 7,290,264 B1 | 10/2007 | Powers et al. | |
| 7,366,185 B2 | 4/2008 | Bush | |
| 7,454,458 B2 | 11/2008 | Islam et al. | |
| 7,523,163 B2 | 4/2009 | Zhu et al. | |
| 7,539,216 B2 | 5/2009 | Johns et al. | |
| 7,587,465 B1 | 9/2009 | Muchow | |
| 7,613,800 B2 | 11/2009 | Dhupelia | |
| 7,640,298 B2 | 12/2009 | Berg | |
| 7,680,908 B2 | 3/2010 | Gates, III et al. | |
| 7,711,847 B2 | 5/2010 | Dhupelia | |
| 7,720,908 B2 | 5/2010 | Newson et al. | |
| 7,730,206 B2 | 6/2010 | Newson et al. | |
| 7,792,902 B2 | 9/2010 | Chatani | |
| 7,822,809 B2 | 10/2010 | Dhupelia | |
| 7,831,666 B2 | 11/2010 | Chatani et al. | |
| 7,877,509 B2 | 1/2011 | Dhupelia | |
| 7,899,017 B2 * | 3/2011 | Yu | H04W 48/18 370/338 |
| 7,908,393 B2 | 3/2011 | Marr et al. | |
| 7,930,345 B2 | 4/2011 | Dhupelia | |
| 7,962,549 B2 | 6/2011 | Dhupelia | |
| 8,032,619 B2 * | 10/2011 | Kato | H04L 67/38 709/203 |
| 8,050,272 B2 * | 11/2011 | Chaturvedi | H04L 63/102 370/252 |
| 8,051,180 B2 | 11/2011 | Mazzaferri et al. | |
| 8,131,802 B2 | 3/2012 | Jacob | |
| 8,214,489 B2 * | 7/2012 | Ballette | H04L 67/104 709/207 |
| 8,335,813 B2 | 12/2012 | Sun et al. | |
| 8,402,124 B1 | 3/2013 | Barillaud et al. | |
| 8,554,842 B2 | 10/2013 | Maehiro | |
| 8,560,707 B2 | 10/2013 | Jacob | |
| 8,719,375 B2 | 5/2014 | Hildreth et al. | |
| 8,725,874 B2 | 5/2014 | Keohane et al. | |
| 8,856,233 B2 | 10/2014 | Lacapra et al. | |
| 8,965,978 B2 * | 2/2015 | Chandranmenon | G06Q 10/107 709/205 |
| 8,972,548 B2 | 3/2015 | Jacob | |
| 8,990,305 B2 * | 3/2015 | Barkley | H04L 12/1827 370/260 |
| 9,032,248 B1 | 5/2015 | Petty et al. | |
| 9,369,540 B2 | 6/2016 | Lowery et al. | |
| 9,516,068 B2 | 12/2016 | Jacob | |
| 9,729,621 B2 | 8/2017 | Jacob | |
| 9,762,631 B2 | 9/2017 | Chatani | |

(56) References Cited

U.S. PATENT DOCUMENTS

| | | |
|---|---|---|
| 10,063,631 B2 | 8/2018 | Jacob |
| 2001/0009868 A1 | 7/2001 | Sakaguchi et al. |
| 2001/0024974 A1 | 9/2001 | Cohen |
| 2001/0037466 A1 | 11/2001 | Fukutake et al. |
| 2001/0044339 A1 | 11/2001 | Cordero et al. |
| 2002/0023117 A1 | 2/2002 | Bernardin et al. |
| 2002/0035604 A1 | 3/2002 | Cohen et al. |
| 2002/0042830 A1 | 4/2002 | Bose et al. |
| 2002/0049086 A1 | 4/2002 | Otsu |
| 2002/0062348 A1 | 5/2002 | Maehiro |
| 2002/0075844 A1 | 6/2002 | Hagen |
| 2002/0075940 A1 | 6/2002 | Haartsen |
| 2002/0082077 A1 | 6/2002 | Johnson |
| 2002/0082086 A1 | 6/2002 | Scallie |
| 2002/0086732 A1 | 7/2002 | Kirmse et al. |
| 2002/0107934 A1 | 8/2002 | Lowery et al. |
| 2002/0107935 A1 | 8/2002 | Lowery et al. |
| 2002/0115488 A1 | 8/2002 | Berry |
| 2002/0133707 A1 | 9/2002 | Newcombe |
| 2002/0142842 A1 | 10/2002 | Easley et al. |
| 2002/0156917 A1 | 10/2002 | Nye |
| 2002/0169889 A1 | 11/2002 | C |
| 2002/0178260 A1 | 11/2002 | Chang |
| 2002/0184070 A1 | 12/2002 | Chen et al. |
| 2003/0018719 A1 | 1/2003 | Ruths |
| 2003/0073494 A1 | 4/2003 | Kalpakian et al. |
| 2003/0126245 A1 | 7/2003 | Feltin et al. |
| 2003/0167343 A1 | 9/2003 | Furuno |
| 2003/0190960 A1 | 10/2003 | Jokipii |
| 2003/0204566 A1 | 10/2003 | Dhupelia |
| 2003/0204593 A1 | 10/2003 | Brown et al. |
| 2003/0214943 A1 | 11/2003 | Engstrom et al. |
| 2003/0216181 A1 | 11/2003 | Daniell et al. |
| 2003/0217135 A1 | 11/2003 | Chatani |
| 2003/0217158 A1 | 11/2003 | Van Datta |
| 2003/0233537 A1 | 12/2003 | Wohlgemuth et al. |
| 2004/0001476 A1 | 1/2004 | Islam et al. |
| 2004/0002384 A1 | 1/2004 | Multerer |
| 2004/0024879 A1 | 2/2004 | Dingman |
| 2004/0030787 A1 | 2/2004 | Jandel |
| 2004/0031052 A1 | 2/2004 | Wannamaker et al. |
| 2004/0053690 A1 | 3/2004 | Fogel |
| 2004/0059711 A1 | 3/2004 | Jandel |
| 2004/0117443 A1 | 6/2004 | Barsness |
| 2004/0139228 A1 | 7/2004 | Takeda |
| 2005/0038836 A1 | 2/2005 | Wang |
| 2005/0068894 A1 | 3/2005 | Yu et al. |
| 2005/0105526 A1 | 5/2005 | Stiemerling |
| 2005/0144521 A1 | 6/2005 | Werner |
| 2005/0181878 A1 | 8/2005 | Danieli et al. |
| 2005/0245317 A1 | 11/2005 | Arthur et al. |
| 2005/0251577 A1 | 11/2005 | Guo |
| 2005/0259637 A1 | 11/2005 | Chu |
| 2005/0262411 A1 | 11/2005 | Vertes |
| 2006/0015560 A1 | 1/2006 | MacAuley et al. |
| 2006/0047836 A1 | 3/2006 | Rao et al. |
| 2011/0375526 | 3/2006 | Chatani |
| 2006/0075127 A1 | 4/2006 | Juncker |
| 2006/0085792 A1 | 4/2006 | Traut |
| 2006/0092942 A1 | 5/2006 | Newson et al. |
| 2006/0100020 A1 | 5/2006 | Kasai |
| 2006/0142085 A1* | 6/2006 | Kim ............... A63F 13/12 463/42 |
| 2006/0168107 A1 | 6/2006 | Balan et al. |
| 2006/0164974 A1 | 7/2006 | Ramalho et al. |
| 2006/0190540 A1 | 8/2006 | Chatani |
| 2006/0200551 A1 | 9/2006 | Bali et al. |
| 2006/0218274 A1 | 9/2006 | Labio et al. |
| 2006/0218275 A1 | 9/2006 | Labio et al. |
| 2006/0247011 A1 | 11/2006 | Gagner |
| 2006/0248144 A1 | 11/2006 | Zhu et al. |
| 2006/0253595 A1 | 11/2006 | Van Datta |
| 2006/0258463 A1 | 11/2006 | Cugno et al. |
| 2006/0288103 A1 | 12/2006 | Gobara |
| 2007/0058792 A1 | 3/2007 | Chaudhari |
| 2007/0061460 A1 | 3/2007 | Khan |
| 2007/0076729 A1 | 4/2007 | Takeda |
| 2007/0094325 A1 | 4/2007 | Ih et al. |
| 2007/0099702 A1* | 5/2007 | Tupper ............... A63F 13/12 463/42 |
| 2007/0165629 A1 | 7/2007 | Chaturvedi |
| 2007/0174399 A1 | 7/2007 | Ogle et al. |
| 2007/0191109 A1 | 8/2007 | Crowder |
| 2007/0208748 A1 | 9/2007 | Li |
| 2007/0217436 A1 | 9/2007 | Markley |
| 2007/0233865 A1 | 10/2007 | Garbow et al. |
| 2007/0288598 A1 | 12/2007 | Edeker et al. |
| 2007/0291706 A1 | 12/2007 | Miller et al. |
| 2008/0049755 A1 | 2/2008 | Gannon et al. |
| 2008/0189365 A1 | 8/2008 | Narayanaswami et al. |
| 2008/0243953 A1 | 10/2008 | Wu et al. |
| 2008/0280686 A1 | 11/2008 | Dhupelia et al. |
| 2008/0291839 A1 | 11/2008 | Hooper et al. |
| 2009/0006545 A1 | 1/2009 | Dhupelia |
| 2009/0006604 A1 | 1/2009 | Dhupelia |
| 2009/0077245 A1 | 3/2009 | Smelyansky |
| 2009/0089363 A1 | 4/2009 | Keohane et al. |
| 2009/0094370 A1 | 4/2009 | Jacob |
| 2009/0113060 A1 | 4/2009 | Jacob |
| 2009/0138610 A1 | 5/2009 | Gobara |
| 2009/0157882 A1 | 6/2009 | Kashyap |
| 2009/0240821 A1 | 9/2009 | Juncker |
| 2009/0287828 A1 | 11/2009 | Wei et al. |
| 2010/0153496 A1 | 6/2010 | Heinla |
| 2010/0279767 A1 | 11/2010 | Dhupelia |
| 2010/0285872 A1 | 11/2010 | Dhupelia |
| 2010/0287239 A1 | 11/2010 | Chatani |
| 2012/0166651 A1 | 6/2012 | Jacob |
| 2013/0304931 A1 | 11/2013 | Jacob |
| 2014/0256449 A1 | 9/2014 | Chatani et al. |
| 2015/0180958 A1 | 6/2015 | Jacob |
| 2018/0013802 A1 | 1/2018 | Chatani |
| 2018/0013820 A1 | 1/2018 | Jacob |

FOREIGN PATENT DOCUMENTS

| | | |
|---|---|---|
| EP | 1499987 | 1/2005 |
| EP | 2360874 | 8/2011 |
| EP | 2360875 | 8/2011 |
| GB | 2325543 A | 11/1998 |
| IN | 269863 | 12/2015 |
| JP | 05-022346 | 1/1993 |
| JP | 63-232725 | 9/1998 |
| JP | 11-234326 | 8/1999 |
| JP | 2000-124939 | 4/2000 |
| JP | 2000-157724 | 6/2000 |
| JP | 2001-187273 | 7/2001 |
| JP | 2001-314657 | 11/2001 |
| JP | 2002-011251 | 1/2002 |
| JP | 2003-099337 | 4/2003 |
| TW | 201347493 | 11/2013 |
| TW | I491229 | 7/2015 |
| WO | WO 2000/05854 | 2/2000 |
| WO | WO 2000/10099 | 2/2000 |
| WO | WO 2000/68864 | 11/2000 |
| WO | WO 2001/63423 | 8/2001 |
| WO | WO 2001/82678 | 11/2001 |
| WO | WO 2002/35769 | 5/2002 |
| WO | WO 2003/091894 | 11/2003 |
| WO | WO 2003/100643 | 12/2003 |
| WO | WO 2004/063843 | 7/2004 |
| WO | WO 2005/088466 | 9/2005 |
| WO | WO 2006/023508 | 3/2006 |
| WO | WO 2009/045475 | 4/2009 |

OTHER PUBLICATIONS

"Brief of Appellants," in re Masayuki Chatani et al., U.S. Court of Appeals for the Federal Circui (2007-1150) (Mar. 23, 2007).
"In Re Masayuki Chatani and Glen Van Datta," United States Court of Appeals for the Federal Circuit, 2007-1150 (U.S. Appl. No. 11/211,128), Nov. 19, 2007.

(56) References Cited

OTHER PUBLICATIONS

"Petition for Panel Rehearing," In Re Masayuki Chatani and Glen Van Datta, Appeal From the United States Patent and Trademark Office, Board of Patent Appeals and Interferences, In the United States Court of Appeals for the Federal Circuit, 2007-1150 (U.S. Appl. No. 10/211,128), Jan. 3, 2008.
"Reply Brief of Appellants," In re Masayuki Chatani et al., U.S. Court of Appeals for the Federal Circuit (2007-1150) (Jun. 4, 2007).
"Technical Issues of establishing any-to-any 2-way real-time communications over the internet," Apr. 24, 2005, URL http://web.archive.org/web/20050424081036/.
Aronson, Jesse. "Using Groupings for Networked Gaming," Gamasutra.com, Jun. 21, 2000.
Audet, F. Nat Behavioral Requirements for Unicast UDP, BEHAVE Internet-Draft, Jul. 15, 2005.
Boulic, Ronan etl al. "Integration of Motion Control Techniques for Virtual Human and Avatar Real-Time Animation," Swiss Fedl Inst. Of Tech., Lausanne, Switzerland, Sep. 1997.
Chiueh, Tzi-cker, "Distributed Systems Support for Networked Games," Computer Science Department, State University of New York at Stony Brook, Stony Brook, NY, May 1997.
Cisco Systems Inc., "Network Flow Management: Resource Reservation for Multimedia Flows," Mar. 19, 1999.
Diot et al., "A Distributed Architecture for Multiplayer Interactive Applications on the Internet", Aug. 1999, Network, IEEE, vol. 13, Issue 4, Jul.-Aug. 1999, pp. 6-15.
ECC Report 50. "Technical Issues of Establishing Any-to-Any-2-Way Real-Time Communications over the Internet." Electronic Communications Committee (ECC). Gothenburg, Jul. 2004.
Festa and Borland, "Netscape alumni to launch P2P company", Aug. 2, 2001, (avaiable at http://news.cnet.com/news/0-1005-202-6766377.html).
Hagsand O: Interactive Multiuser Ves in the DIVE System: IEEE Multimedia, IEEE Service Center, New York, NY, US vol. 3, No. 1, 21 Mar. 21, 1996, pp. 30-39, XP000582951 ISSN: 1070-986X.
Hanada, S. "The Design of Network Game and DirectPlay," Inside Windows, Softbank K.K., vol. 4, pp. 42-57, Apr. 1, 1998.
Rosenberg, J. Interactive Connectivity Establishment (ICE): A Methodology for Network Address Translator (NAT) Traversal for Multimedia Session Establishment Protocols, Mmusic Internet-Draft, Jul. 19, 2004.
Rosenberg, J. Interactive Connectivity Establishment (ICE): A Methodology for Network Address Translator (NAT) Traversal for Offer/Answer Protocols, Mmusic Internet-Draft, Jul. 17, 2005.
Rosenberg, J. Interactive Connectivity Establishment (ICE): A Methodology for Network Address Translator (NAT) Traversal for Multimedia Session Establishment Protocols, Mmusic Internet-Draft, Oct. 25, 2004.
Rosenberg, J. Interactive Connectivity Establishment (ICE): A Methodology for Network Address Translator (NAT) Traversal for Off/Answer Protocols, Mmusic Internet-Draft, Jan. 16, 2007.
Rosenberg, J. "Simple Traversal of UDP Through Network Address Translators (NAT)," BEHAVE Internet-Draft, Jul. 17, 2005.
Rosenberg, J. STUN—Simple Traversal of User Datagram Protocols (UDP) Throught Network Address Translators (NATs), Network Working Group, Mar. 2003.
Rosenberg, J. Traversal using Relay NAT (TURN), MIDCOM Internet-Draft, Oct. 20, 2003.
Takeda, Y. Symmetric NAT Traversal Using STUN, Internet Engineering Task Force, Jun. 2003.
PCT/US03/08682 International Search Report dated Oct. 14, 2003.
PCT/US03/12668 International Search Report dated Jul. 17, 2003.
PCT/US08/11415 Search Report and Written Opinion dated Dec. 5, 2008.
EP 037211413, European Search Report dated Jun. 30, 2005.
Chinese Application No. 03801033, Office Action dated Jun. 9, 2006.
Chinese Application No. 03801033, Office Action dated Jul. 5, 2011.
Chinese Application No. 03801033, Office Action dated Sep. 25, 2009.
Chinese Application No. 201410266012.9, Office Action dated Jul. 27, 2016.
European Application No. 03724201.3, Office Action dated Dec. 13, 2013.
European Application No. 03724201.3, Office Action dated Jul. 3, 2012.
Chinese Application No. 200810168739.8, Decision of Rejection dated Dec. 11, 2012.
Chinese Application No. 200810168739.8, Office Action dated May 11, 2012.
Chinese Application No. 200810168739.8, Office Action dated May 19, 2011.
Chinese Application No. 20088011547.1, Decision of Rejection dated Jul. 5, 2013.
Chinese Application No. 20088011547.1, Office Action dated Oct. 12, 2012.
Chinese Application No. 20088011547.1, Office Action dated Mar. 7, 2012.
Chinese Application No. 20088011547.1, Office Action dated Aug. 10, 2012.
EP 08014892.7 Office Action dated Jul. 20, 2011.
Taiwan Application No. 097138349, Office Action dated Mar. 26, 2014.
Taiwan Application No. 097138349, Office Action dated Jan. 29, 2013.
EP 08835745.4 Extended European Search Report dated Jul. 22, 2011.
EP 11004182.9 Extended European Search Report dated Jul. 14, 2011.
EP 11004181.1 Extended European Search Report dated Jul. 22, 2011.
U.S. Appl. No. 10/211,128 Final Office Action dated Feb. 2, 2004.
U.S. Appl. No. 10/211,128 Office Action dated Nov. 10, 2003.
U.S. Appl. No. 11/375,526 Office Action dated Apr. 8, 2008.
U.S. Appl. No. 11/375,526 Final Office Action dated Jul. 3, 2007.
U.S. Appl. No. 11/375,526 Final Office Action dated Mar. 2, 2007.
U.S. Appl. No. 11/375,526 Office Action dated Oct. 24, 2006.
U.S. Appl. No. 11/403,623 Office Action dated Jun. 25, 2009.
U.S. Appl. No. 11/403,623 Office Action dated Apr. 9, 2008.
U.S. Appl. No. 11/403,623 Final Office Action dated Jul. 3, 2007.
U.S. Appl. No. 11/403,623 Final Office Action dated Mar. 5, 2007.
U.S. Appl. No. 11/403,623 Office Action dated Oct. 24, 2006.
U.S. Appl. No. 12/840,977 Office Action dated Jul. 30, 2013.
U.S. Appl. No. 12/840,977 Final Office Action dated Jun. 18, 2012.
U.S. Appl. No. 12/840,977 Final Office Action dated Oct. 19, 2011.
U.S. Appl. No. 12/840,977 Office Action dated May 16, 2011.
U.S. Appl. No. 12/840,977 Final Office Action dated Dec. 3, 2010.
U.S. Appl. No. 14/283,959 Office Action dated Jan. 11, 2017.
U.S. Appl. No. 14/283,959 Final Office Action dated Jul. 19, 2016.
U.S. Appl. No. 14/283,959 Office Action dated Feb. 4, 2016.
U.S. Appl. No. 10/359,359 Final Office Action dated Nov. 27, 2009.
U.S. Appl. No. 10/359,359 Office Action dated Mar. 31, 2009.
U.S. Appl. No. 10/359,359 Office Action dated Aug. 27, 2007.
U.S. Appl. No. 10/359,359 Final Office Action dated Feb. 9, 2007.
U.S. Appl. No. 10/359,359 Office Action dated Aug. 8, 2006.
U.S. Appl. No. 12/839,306 Office Action dated Nov. 12, 2010.
U.S. Appl. No. 12/839,311 Office Action dated Nov. 12, 2010.
U.S. Appl. No. 12/218,581 Office Action dated Sep. 2, 2010.
U.S. Appl. No. 12/218,581 Office Action dated Feb. 1, 2010.
U.S. Appl. No. 12/218,581 Office Action dated Oct. 2, 2009.
U.S. Appl. No. 12/218,591 Office Action dated Feb. 25, 2009.
U.S. Appl. No. 13/918,809 Office Action dated Nov. 29, 2017.
U.S. Appl. No. 13/918,809 Office Action dated May 10, 2017.
U.S. Appl. No. 13/918,809 Office Action dated Oct. 20, 2016.
U.S. Appl. No. 13/918,809 Final Office Action dated Nov. 18, 2015.
U.S. Appl. No. 13/918,809 Office Action dated Apr. 29, 2015.
U.S. Appl. No. 13/918,809 Office Action dated Jun. 10, 2014.
U.S. Appl. No. 12/049,954 Final Office Action dated Dec. 14, 2010.
U.S. Appl. No. 12/049,954 Office Action dated Jun. 24, 2010.
U.S. Appl. No. 12/235,438 Final Office Action dated Jan. 4, 2012.
U.S. Appl. No. 12/235,438 Office Action dated Aug. 8, 2011.

(56) References Cited

OTHER PUBLICATIONS

U.S. Appl. No. 12/235,438 Final Office Action dated Aug. 31, 2010.
U.S. Appl. No. 12/235,438 Office Action dated Apr. 15, 2010.
U.S. Appl. No. 13/412,361 Office Action dated Jun. 17, 2014.
U.S. Appl. No. 13/412,361 Final Office Action dated Nov. 28, 2012.
U.S. Appl. No. 13/412,361 Office Action dated Jul. 30, 2012.
U.S. Appl. No. 13/941,436 Final Office Action dated Oct. 7, 2015.
U.S. Appl. No. 13/941,436 Office Action dated Jun. 22, 2015.
U.S. Appl. No. 14/637,182 Office Action dated Sep. 9, 2016.
U.S. Appl. No. 15/672,113 Office Action dated Mar. 8, 2018.
U.S. Appl. No. 15/702,580 Office Action dated Jan. 24, 2019.
U.S. Appl. No. 15/702,580 Final Office Action dated May 13, 2019.
U.S. Appl. No. 13/918,809 Office Action dated Jul. 12, 2019.
U.S. Appl. No. 15/688,592 Office Action dated Nov. 14, 2019, retrieved from palm, 27 pages.

\* cited by examiner

SYSTEMS AND METHODS FOR SEAMLESS HOST MIGRATION

CROSS-REFERENCE TO RELATED APPLICATIONS

This application is a continuation and claims the priority benefit of U.S. patent application Ser. No. 15/672,113 filed Aug. 8, 2017, which is a continuation and claims the priority benefit of U.S. patent application Ser. No. 14/637,182 filed Mar. 3, 2015, now U.S. Pat. No. 9,729,621, which is a continuation and claims the priority benefit of U.S. patent application Ser. No. 13/412,361, filed Mar. 5, 2012, now U.S. Pat. No. 8,972,548, which is a continuation and claims the priority benefit of U.S. patent application Ser. No. 12/049,954 filed Mar. 17, 2008, now U.S. Pat. No. 8,131,802, which claims the priority benefit of U.S. provisional patent application No. 60/997,918 filed Oct. 5, 2007, the disclosures of which are incorporated herein by reference.

The present invention application is related to U.S. patent application Ser. No. 10/211,128 filed Jul. 31, 2002 and entitled "Dynamic Player Management," the disclosure of which is incorporated herein by reference. The present application is further related to U.S. patent application Ser. No. 10/359,359 filed Feb. 4, 2003 and entitled "Multi-User Application Program Interface," the disclosure of which is incorporated herein by reference.

BACKGROUND OF THE INVENTION

Field of the Invention

The present invention relates generally to networks. More specifically, the present invention relates to data distribution in networks.

Description of Related Art

A network may include a group of computing devices connected together by a communications system. A computer in the network may communicate, exchange data, and share resources with the other computers in the network. Examples of networks include a personal area network (PAN), local area network (LAN), and wide area network (WAN).

Various network configurations are known in the art. The traditional client-server network illustrated in FIG. 1A includes a host 110 connected to clients 120A-D. The host 110 establishes the network session 130, controls which and how many clients may join the network session 130 and how the clients 120A-D interact with each other once they have joined network session 130. Because the host 110 generally has large amounts of bandwidth and processing power, the host 110 is may be capable of managing and distributing data to and from all the clients 120A-D in the network session 130. In such a configuration, data from a particular client (e.g., client 120D) may be distributed to other clients (e.g., clients 120A-C) through the host 110. For example, client 120D may transmit data to the host 110. When another client, such as client 120A, requests that data, the host 110 transmits that data to client 120A.

By virtue of being connected to the host, a client may request only the data that the client needs (via the host) so that the client does not have to manage otherwise unneeded data. Such an arrangement may be common amongst clients that do not have the ability to effectively manage all the data exchanged within a network session. These clients may require a host to manage and distribute the data.

A disadvantage of having the host manage and distribute data in a network session is that data can be lost when there are connectivity issues affecting communications between the host and any one of the session clients. In such an instance, the data from a particular client cannot be transmitted to the host. That data would also be unavailable to the other clients in the network. For example, client 120D may suddenly become disconnected from the host 110. Information that client 120D would have sent to the host 110 never reaches the host 110 and, as a consequence, the information cannot be transmitted to the rest of the network (i.e., clients 120A-C). The missing information may cause a disruption to the network session 130, possibly affecting the operations of the other clients. This may be especially true in the context of interactive network game play.

There is, therefore, a need in the art for improved systems and methods for network data distribution that addresses problems related to network session connectivity and maintaining an uninterrupted exchange of data in the session.

SUMMARY OF THE INVENTION

Systems and methods of the present invention provide for maintaining network data distribution that would allow a network session to weather interrupted communication between a host and clients without any loss of data. Host functions migrate to a client seamlessly and without significant loss of data. Embodiments of the present invention provide for one or more clients to serve as a backup host for the network session. When the other clients transmit data to the host, they may also transmit the data to one or more backup hosts. For example, a client that sends data to the host may not receive acknowledgement of the data within a certain period of time. That client may re-transmit the data to the host, as well transmit the data to the backup host.

Various embodiments of the present invention include methods for network data distribution. Such methods include connecting a host to clients, determining whether a client is capable of serving as a backup host, and if so, transmitting to that client certain information that would allow the client serve as the backup host. Serving as the backup hosts includes receiving information from other clients when those other clients cannot communicate with the host. In some embodiments of the present invention, the method further provides for indicating that communications between a host and a client are interrupted and for terminating the connection between the host and the particular client.

Various embodiments of the present invention include systems for network data distribution. Such systems may include a host, a first client capable of serving as a backup host, and a second client capable of transmitting data to the first client when communications between the host and the second client is interrupted. In some embodiments of the present invention, the second client may also serve as a backup host. Some embodiments of the present invention may include a plurality of clients, each configured to serve as backup hosts.

A host system for use in network distribution systems may also be provided by embodiments of the present invention. Such host systems may include an acknowledgement module to acknowledge client communications upon receipt, a negotiation module to negotiate whether a particular client is capable of serving as a backup host, and a backup application module to deliver to the client an application providing host information. Some embodiments of the present invention further include a host information database and a timer.

Some embodiments of the present invention include computer storage media and instructions for network data distribution. Such instructions may provide for connecting a host to clients, negotiating with a client capable of serving as a backup host, and transmitting host information to the client so that it may begin serving as a backup host.

DETAILED DESCRIPTION

The present invention includes systems and methods for network data distribution. Embodiments of the present invention may allow host migration to occur seamlessly. A network session may continue without significant loss of data in the event of interrupted communication between a host and a client. A host of a network session may be connected to a number of clients. One (or more) of these clients may be capable of serving as a backup host. Backup viability is negotiated with a client and host information is transmitted to the client, which may then act as a backup host. The backup host may then connect to and receive data from the other clients in the network session. Thereafter, if communication between the host and a particular client is interrupted, that particular client may transmit its data to the backup host allowing the network session to continue without any loss of data.

The elements identified throughout are exemplary and may include various alternatives, equivalents, or derivations thereof. Various combinations of hardware, software, and computer-executable instructions may be utilized. Program modules and engines may include routines, programs, objects, components, and data structures that effectuate the performance of particular tasks when executed by a processor, which may be general purpose or application specific. Computer-executable instructions and associated data structures stored in a computer-readable medium represent examples of programming means for executing the steps of the methods and/or implementing particular system configurations disclosed herein.

Figure 1A:
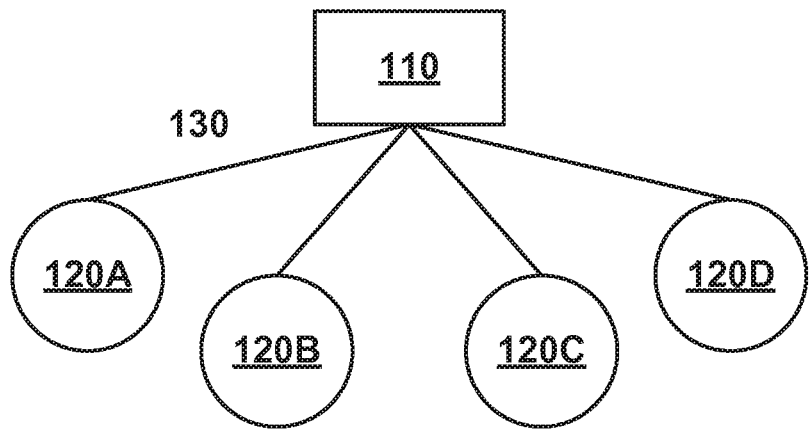
FIG. 1A illustrates a client-server network configuration as it is known in the art.

In the client-server network configuration illustrated in FIG. 1A and as discussed in detail above, each client does not have to process all the data in a network session. Instead, each client receives and processes only the data that is necessary for the client to participate in the network session. Some clients are not capable of managing all the data efficiently due to, for example, lack of bandwidth or lack of processing power. Some clients, however, do have the ability to manage all the data in a network session. These particular clients may act as backup hosts, storing some or all of the data from the network session.

Figure 1B:
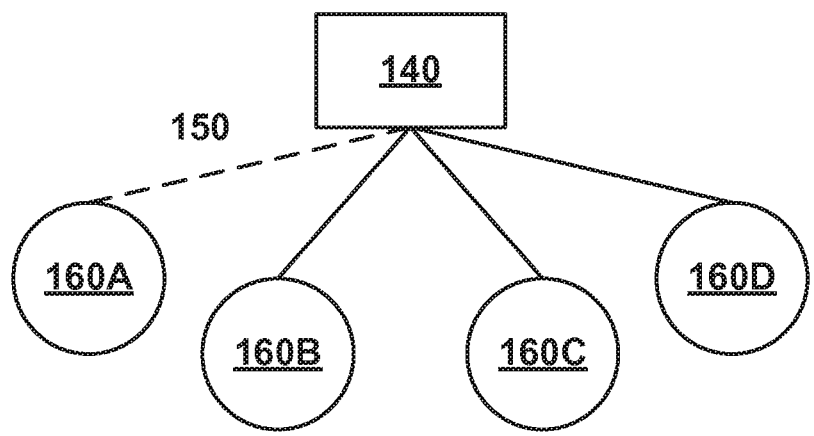
FIG. 1B illustrates an exemplary system for network data distribution with one backup host.

In contrast to the system configuration of FIG. 1A, FIG. 1B illustrates an exemplary system for network data distribution with one backup host, client 160A. A backup host may be any client capable of performing some or all of the functions of a host of a network session. When the host 140 of the network session 150 cannot or does not perform, some or all of the hosting responsibilities may migrate to a backup host. To qualify as a backup host requires the candidate host (client) to exhibit backup viability. Exhibiting backup viability may involve meeting one or more requirements concerning, for example, bandwidth, processing power, memory, hardware or software configurations, or quality of service. A client's backup viability may be determined through negotiation with the host.

After completing negotiations concerning and confirming backup viability, host information may be transmitted between host 140 and client 160A through network session 150. The host information may include the network name, the internet protocol (IP) addresses of the clients in the network, firewall information, and information concerning specific responsibilities should client 160A need to takeover certain host responsibilities. Using the host information, client 160A may be able to act as a backup host in the event that one or more connections between the host 140 and the other clients 160B-D become interrupted. For example, if client 160B becomes disconnected from host 140, client 160B may transfer data to client 160A as will be illustrated in the context of FIG. 3A and FIG. 3B. By migrating host responsibilities from host 140 to client 160A, information from client 160B is not completely lost to the network session 150.

Figure 1C:
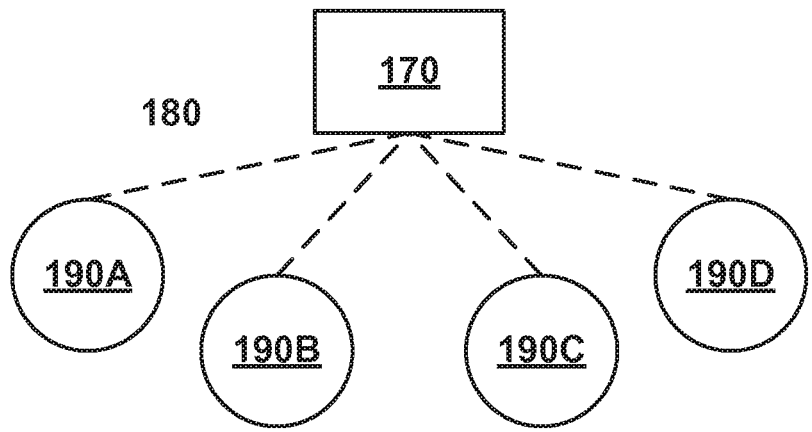
FIG. 1C illustrates an exemplary system for network data distribution with several backup hosts.

In some embodiments, more than one client may be capable of serving as backup hosts. FIG. 1C illustrates an exemplary system for network data distribution with several backup hosts—clients 190A-D. Each client in the network session 180 of FIG. 1C may be responsible for particular backup host responsibilities should original host 170 become unavailable. For example, client 190A may be responsible for scorekeeping while client 190B may be responsible for state changes in the game environment. Client 190C may be responsible for admissions criteria (e.g., who may participate in the game) whereas client 190D may be responsible for chat functionality. Alternatively, client 190A may be responsible for all of the aforementioned tasks and clients 190B-D take over those tasks should client 190A subsequently fail.

Figure 2:
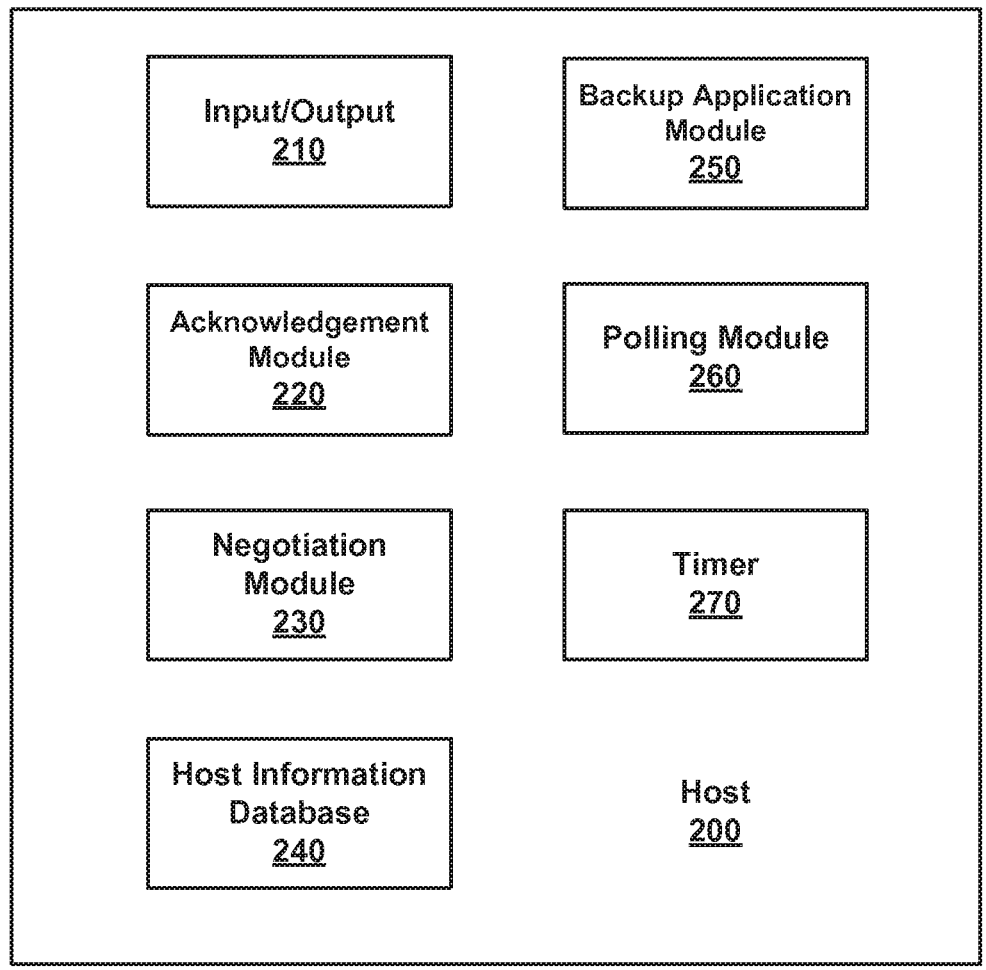
FIG. 2 illustrates an exemplary configuration for a computing device offering seamless host migration in a network data distribution system.

FIG. 2 illustrates an exemplary configuration 200 for a computing device offering seamless host migration in a network data distribution system. The host 200, which may act as a central communications hub in a network, may be a computing device such as a server. A computing device typically reserved for client operations may also exhibit some or all of the configurations of host 200 due to the fact that a client may, at some point, become a backup host. Host 200 may include a network interface 210, acknowledgement module 220, negotiation module 230, host information database 240, backup application module 250, polling module 260, and timer 270.

A module (or application), as referenced in the present invention, is a collection of routines that perform various system-level functions. A module may be dynamically loaded and unloaded by hardware and device drivers as required. The modular software components described herein may also be incorporated as part of a larger software platform or integrated as part of an application specific component.

Network interface 210 may be any of a variety of hardware and/or software components configured to allow for communication between the host and other computing devices in the network. Network interface 210 may include components for communicating over wired, wireless, and/or Internet-based communications networks.

Acknowledgement module 220 allows for verification that information transmitted by a client was received by the host 200. When host 200 receives information from a client through network interface 210, acknowledgement module 220 may transmit an acknowledgement of receipt (ACK) to the client sending the information. For example, if a client sends information concerning a change in game state data to host 200, acknowledgement module 220 may transmit an ACK reply to the transmitting client indicating that information was received. The ACK reply sent by acknowledgement module 220 may further include an indication of what information was received and how much of that information was received and/or if any of that information was corrupted or otherwise incomplete.

Non-receipt of an ACK with respect to a particular data transmission by the transmitting client may indicate that the data transmission was never received by the host 200. Non-receipt of the data transmission (or a portion thereof) by the host 200 may indicate a problem with the connection between the host 200 and the client that sent the data transmission or the host 200 in and of itself. If a particular number of data transmissions fail to receive an ACK reply from the host 200, the transmitting client may invoke a migration operation whereby some or all of the host functionalities are migrated to a backup host.

Negotiation module 230 negotiates the backup viability of a client based on a variety of parameters. For example, a viable backup host/client candidate may be required to have a certain amount of available bandwidth. The bandwidth of the client may need to be sufficient to allow the client to manage all the data in the network session. Backup viability may require that the client conform to various quality of service standards as they relate to, for example, ping rate, packet loss, available memory, processor speed, and the like.

Negotiation module 230 may further determine whether the client candidate is capable of connecting to each of the other clients in the network. A viable backup host may need to be able to connect to and receive information from each of the other clients in the network. The parameters for backup viability may be determined by the type of network session. For example, a particular gaming network session may require a certain amount of bandwidth and processor speed for backup viability due to the number of state changes that may occur in the game environment. Less complex transactions, such as simple file transfers, may require less bandwidth and/or processing power.

Negotiation module 230 may be configured to negotiate backup viability with multiple clients thereby resulting in a series of backup hosts. Alternatively, the negotiation module 230 may be configured to allocate backup responsibilities for particular tasks amongst a group of clients. By providing for a series of backup hosts, hosting duties may migrate seamlessly from a host to a first backup host to a second backup host and so on as network or host/client conditions warrant. An order of backup host responsibilities and/or the particular responsibilities may be assigned based on the order in which the clients connected to the host. Alternatively, order and/or responsibilities may be based on other factors such as bandwidth or quality of service.

Host information database 240 may store information concerning the host, the clients, or the network session. The information stored in host information database 240 may allow for a computing device to perform certain hosting duties, such as connecting to the other clients in the network session. Such host information may include the network name, the Internet protocol (IP) addresses of the clients in the network, and firewall information. Host information database 240 may be updated when events such as a client disconnecting from the network or a new client joining the network occur. The IP addresses of the new clients would, for example, need to be added to the host information database 240.

Operating in conjunction with host information database 240, backup application module 250 generates an application that may be downloaded, installed, and executed on the client. This application provides a client with certain operational functionality that may be required of the client in order for it to serve as a backup host in addition to satisfying underlying viability requirements. The application may configure the client for connecting to and for exchanging data with other clients in the network session.

Optional polling module 260 may be configured to poll all the clients in a network session. Polling module 260 may be used to poll clients for connectivity. Polling for connectivity may include sending small packets of data to each client in the network session, receiving replies/acknowledgments from clients that have received the data packets, and determining which clients have problems communicating with the host 200.

Polling module 260 may automatically poll clients at periodic intervals. Polling module 260 may also be configured to poll clients when certain events occur, such as a new client joining the network session or an indication of interrupted communication (e.g., a client does not acknowledge data sent by host 200). The polling operation of polling module 260 may be akin to a periodic heartbeat like that described in U.S. patent publication number 2003-0204566 for a "Multi-User Application Program Interface," the disclosure of which has previously been incorporated by reference.

Host 200 may also include a timer 270. Timer 270 may be configured to measure how much time has elapsed after an event. Host 200 may use timer 270 to determine the time between a data transmission like that generated by polling module 260 and acknowledgement of that data transmission. Such information may be used to determine whether to terminate a connection to a particular client. If host 200 receives no acknowledgment or no poll response from a particular client for a period of time, as measured by timer 270, host 200 may terminate the connection with that client.

The application generated by the backup application module 250 may further include certain functionality similar to that of polling module 260 and timer 270. Unlike the host 200 that may be seeking to determine whether to eject a particular client from the network session, this 'heartbeat' functionality may be used by a client designated as a backup host to determine when the host 200 is no longer capable or has continuously failed to fulfill certain host duties. The inability or failure of a host 200 to fulfill certain duties may be indicated by a continued lack of receipt of an ACK or heartbeat as may be generated by acknowledgment module 220.

Figure 3A:
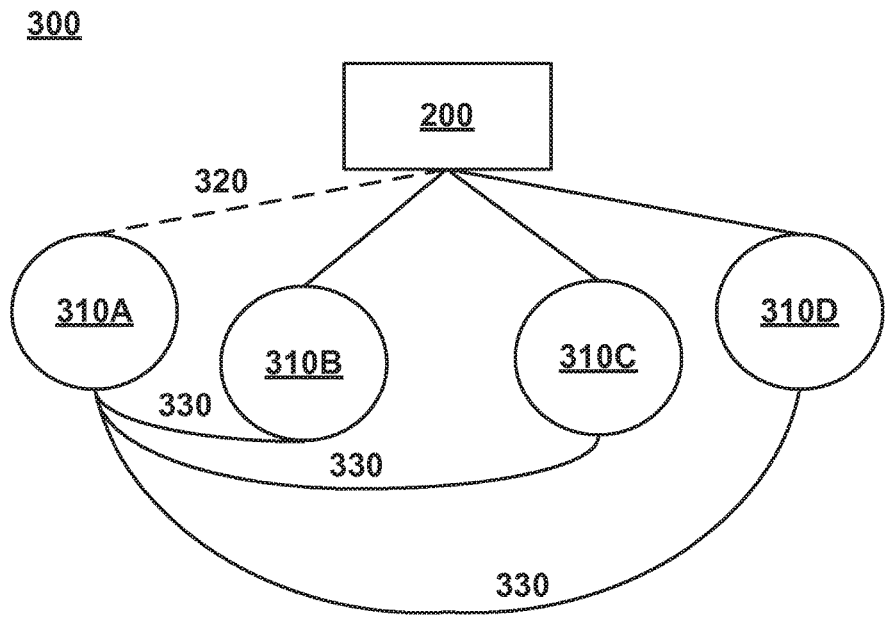
FIG. 3A illustrates an implementation of an exemplary system for network data distribution.

FIG. 3A illustrates an implementation of an exemplary system 300 for network data distribution. Host 200 is connected to a plurality of clients 310A-D. Client 310A has successfully negotiated backup viability with host 200 and received host information through connection 320. Using the host information, client 310A connects to the other clients in the network, namely, clients 310B-D. Connections 330 allow for clients 310B-D to communicate directly (i.e., not through host 200) with client 310A. Clients 310B-D may use the connections 330 to exchange data with client 310A if each respective client has difficulty transmitting that data to the host 200. Clients 310B-D may also transmit data to client 310A automatically, irrespective of any difficulties with data transmissions to the host 200.

Figure 3B:
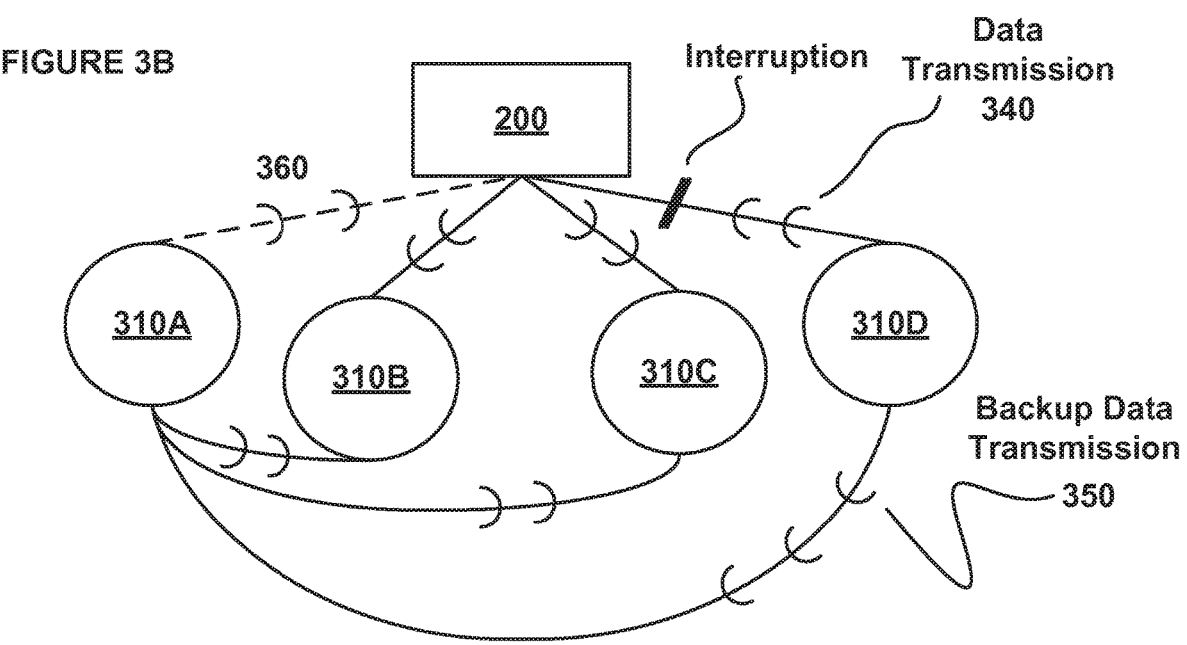
FIG. 3B illustrates an alternate implementation of an exemplary system for network data distribution.

FIG. 3B illustrates an alternate implementation of an exemplary system for network data distribution. In particular, FIG. 3B illustrates an exemplary system for network data distribution where communications between a host 200 and a client 310D are interrupted. Specifically, the illustrated data transmission 340 between host 200 and client 310D is shown as being unsuccessful. While client 310D is attempting to send data transmission 340 to the host 200, a faulty connection prevents the transmission from ever being received by the host 200.

Because client 310A is a backup host for the network session, client 310D can send the same data intended for the host 200 in a backup data transmission 350 directly to client 310A (i.e., not through host 200). Client 310A may then send that data in a data transmission 360 to the host 200. Client 310A, in this particular embodiment, acts as a proxy between client 310D and host 200 due to the faulty connection separating client 310D and host 200. Host 200 may then distribute the data from client 310D to clients 310B and 310C albeit received via client 310A. Alternatively, client 310A may send the data to clients 310B or 310C if, for example, host 200 was unable to maintain host duties versus the connection between client 310D and host 200 simply being defective.

Because communications between the host 200 and client 310D has been disrupted, client 310D may need to obtain session data through client 310A. Client 310A may act as an intermediary for both the receipt and transmission of data with respect to host 200 and client 310D in addition to making requests for data on the behalf of either computing device.

Figure 4:
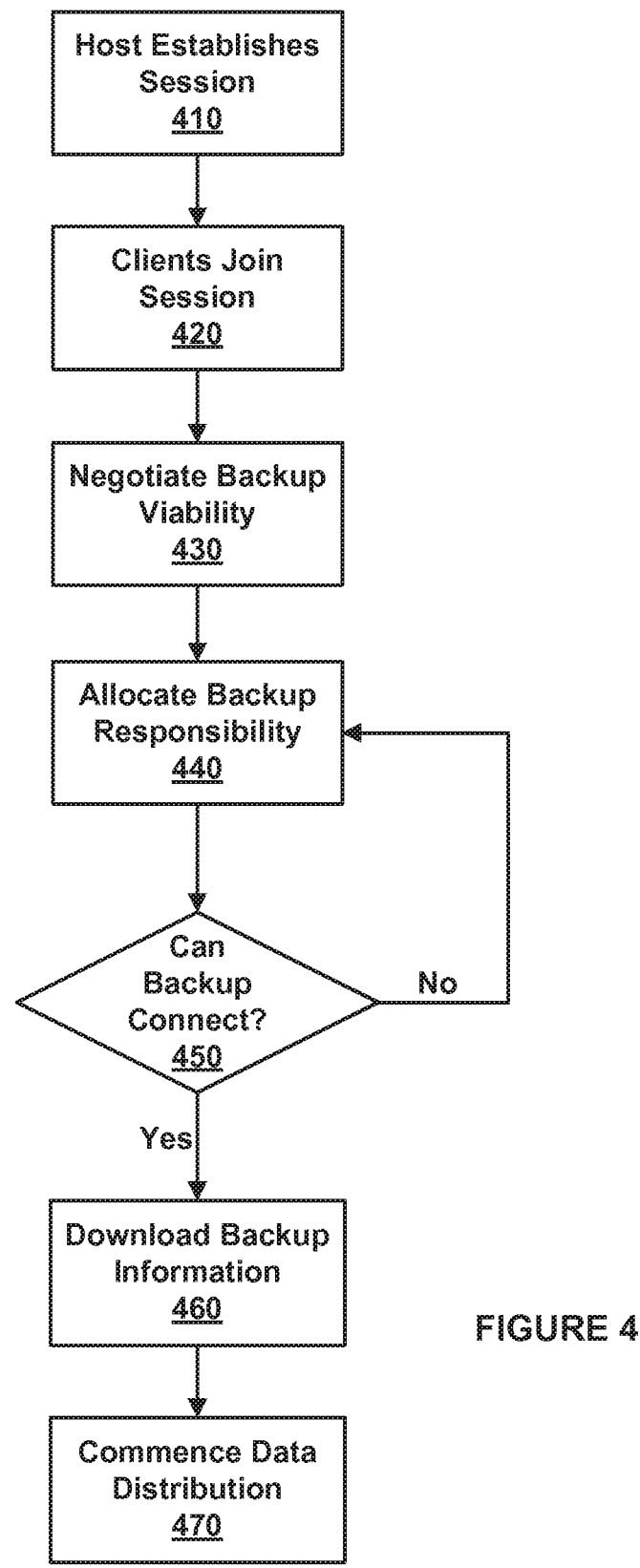
FIG. 4 depicts an exemplary method for network data distribution.

FIG. 4 is a flowchart depicting an exemplary method 400 for network data distribution. The steps identified in FIG. 4 (and the order thereof) are exemplary and may include various alternatives, equivalents, or derivations thereof including but not limited to the order of execution of the same. The steps of the process of FIG. 4 (and its various alternatives) may be embodied in hardware or software including a machine-readable or computer-readable storage medium (e.g., optical disc, memory card, or hard drive) including instructions executable by a processor.

In step 410, a host (e.g., host 200) establishes a network session. The host may set certain parameters for who may join the network session, as well as various aspects of how the network session will proceed. A host may establish a private network session that only certain clients or invited clients may join. Alternatively, the host may establish a network session that is open to the public and any client may join.

In step 420, multiple clients join the network session by connecting to the host. If the host has set certain parameters concerning who may join the network session, the clients may need to satisfy those parameters before being allowed to connect the host or to participate in the network session.

In step 430, backup viability is negotiated via the negotiation module 220 of FIG. 2. One or more clients may be viable backup hosts with the capacity and resources to serve as a backup hosts. Backup viability may be negotiated as soon as a client joins the network session. Various aspects of backup viability, including bandwidth and quality of service, may be evaluated to determine whether a particular client is capable of serving as a backup host. Depending on the requirements of negotiation module 220, there may be one, more than one, or no viable backup hosts among the clients in the network session. Backup responsibilities may also be distributed.

In step 440, backup responsibility is allocated. Where there are multiple clients that are viable backup hosts, backup responsibility may need to be allocated among those clients with respect to order and/or particular responsibilities. Clients in the network session may transmit their data to the first viable backup host as may have been identified by the host or the first deemed backup through a broadcast or other communication as exemplified in U.S. patent publication number 2003-0217135 for "Dynamic Player Management," the disclosure of which has previously been incorporated by reference. If the first viable backup host is or becomes incapable of serving as a backup host, the other clients may transmit their data to the second viable backup host to join the network session. The need to communicate with a secondary backup host may be indicated utilizing means as disclosed herein and/or the aforementioned "Dynamic Player Management" application.

In step 450, it is determined whether a particular client can connect to each of the other clients in the network session. A backup host needs to be able to connect to each and every other client in the session. If a first client cannot connect to a second client, that first client cannot serve as a backup host for the network session. For example, the first client may have firewall issues that would prevent the first client from making certain types of connections. If a potential backup host cannot connect to another client for any reason, the method may return to step 440 and re-allocate backup responsibility.

Once it has been determined that a client is a viable backup host and can connect to all of the other clients in the network session, the method proceeds to step 460. In step 460, backup information is downloaded to a viable backup host. By providing the backup information to a backup host, the host can drop out of the network, and the backup host is capable of providing any information required by the other clients in the network session. Backup information may be provided as a part of the download and installation of an application facilitating seamless host transitions as discussed in the context of backup application module 250 of FIG. 2.

In step 470, network data distribution may commence. As illustrated in FIG. 3A, the data transmissions may occur between a host and a client. As FIG. 3B further illustrates, data transmission may also occur between two clients, from a client with host connectivity issues to a client capable of acting as a backup host. Further, that backup host may forward that data on to the host or directly to the other clients upon request. Through whatever connection(s) the data must be relayed, the data is provided to those computing devices that require that data.

While the present invention has been described with reference to exemplary embodiments, it will be understood by those skilled in the art that various changes may be made and equivalents may be substituted for elements thereof without departing from the true spirit and scope of the present invention. In addition, modifications may be made without departing from the essential teachings of the present invention. Various alternative systems may be utilized to implement the various methodologies described herein and various methods may be used to achieve certain results from the aforementioned systems.

What is claimed is:

1. A method of allocating hosts for network data distribution, the method comprising:
    evaluating backup viability criteria for a plurality of clients within a network;
    transmitting information regarding host responsibilities to a group of the clients that satisfy the backup viability criteria, wherein the host responsibilities are assigned to the group of clients to take over when communication with a current host regarding the host responsibilities is interrupted, wherein a different group of the clients is assigned different host responsibilities;
    allocating the host responsibilities within the group of clients, wherein allocating the host responsibilities includes identifying an order for performing the host responsibilities based on the evaluated backup viability criteria for the group of clients;
    detecting a new client in the plurality of clients based on periodic polling by a polling module;
    updating the group of clients assigned to the host responsibilities based on an evaluated backup viability of the new client, wherein the updated group of clients includes the new client; and
    reallocating host responsibilities within the updated group of clients, wherein reallocating the host responsibilities includes identifying a different order for performing the host responsibilities based on an evaluated backup viability criteria for the updated group of clients.

2. The method of claim 1, wherein the polling module further polls the plurality of clients for connectivity.

3. The method of claim 2, wherein polling for connectivity comprises:
    sending a packet of data to each of the plurality of clients;
    receiving a reply from one or more of the plurality of clients; and
    identifying one or more clients that did not provide a reply as having a connectivity problem.

4. The method of claim 3, further comprising identifying via a timer an amount of elapsed time after the packet of data is sent to each client.

5. The method of claim 4, wherein a connection between the client and the current host is terminated when the elapsed time meets a predetermined period and no reply has been received from the client.

6. The method of claim 1, wherein allocating and reallocating the host responsibilities includes assigning each client within the group of clients a different host responsibility to perform when communication with the current host is interrupted.

7. The method of claim 1, wherein the backup viability criteria comprises at least one of bandwidth, processing power, memory, hardware or software configurations, and quality of service metrics.

8. The method of claim 1, further comprising:
    detecting an interruption in communication with the current host;
    replacing the current host with a first client within the group of clients, wherein the first client communicates with other clients in the group and performs at least a first host responsibility of the host responsibilities; and
    monitoring for further interruption in communication, wherein a next client within the group of clients is assigned to replace the first client in performing the first host responsibility following the further interruption.

9. The method of claim 1, wherein evaluating the backup viability criteria for the group of clients comprises:
    evaluating connections between the current host and each other client in the group; and
    evaluating connections between each client in the group and each other client in the group.

10. A system of allocating hosts for network data distribution, the system comprising:
    a plurality of client devices in a network; and
    a server that is designated a current host for the plurality of client devices, wherein the server comprises:
        memory that maintains information regarding backup viability criteria for the plurality of clients,
        a communication interface that transmits information regarding host responsibilities to a group of the clients that satisfy the backup viability criteria, wherein the host responsibilities are assigned to the group of clients to take over when communication with a current host regarding the host responsibilities is interrupted, wherein a different group of the clients is assigned different host responsibilities, and
        a processor that executes instructions stored in memory, wherein execution of the instructions by the processor:
            allocates the host responsibilities within the group of clients, wherein allocating the host responsibilities includes identifying an order for performing the host responsibilities based on the evaluated backup viability criteria for the group of clients;
            detects a new client in the plurality of clients based on periodic polling by a polling module;
            updates the group of clients assigned to the host responsibilities based on an evaluated backup viability of the new client, wherein the updated group of clients includes the new client; and
            reallocates host responsibilities within the updated group of clients, wherein reallocating the host responsibilities includes identifying a different order for performing the host responsibilities based on an evaluated backup viability criteria for the updated group of clients.

11. The system of claim 10, wherein the server further comprises the polling module, and wherein the polling module is executable to poll the plurality of clients for connectivity.

12. The system of claim 11, wherein the polling module polls the clients for connectivity by:
    sending a packet of data to each of the plurality of clients;
    receiving a reply from one or more of the plurality of clients; and
    identifying one or more clients that did not provide a reply as having a connectivity problem.

13. The system of claim 12, further comprising a timer to identify an amount of elapsed time after the packet of data is sent to each client.

14. The system of claim 13, wherein a connection between the client and the current host is terminated when the elapsed time meets a predetermined period and no reply has been received from the client.

15. The system of claim 10, wherein the processor allocates and reallocates the host responsibilities by assigning each client within the group of clients a different host responsibility to perform when communication with the current host is interrupted.

16. The system of claim 10, wherein the backup viability criteria comprises at least one of bandwidth, processing power, memory, hardware or software configurations, and quality of service metrics.

17. The system of claim 10, wherein the processor executes further instructions stored in memory, wherein execution of the further instructions by the processor:
    detects an interruption in communication with the current host;
    replaces the current host with a first client within the group of clients, wherein the first client communicates with other clients in the group and performs at least a first host responsibility of the host responsibilities; and
    monitors for further interruption in communication, wherein a next client within the group of clients is assigned to replace the first client in performing the first host responsibility following the further interruption.

18. The system of claim 10, wherein the processor executes further instructions stored in memory to evaluate the backup viability criteria by:
    evaluating connections between the current host and each other client in the group; and
    evaluating connections between each client in the group and each other client in the group.

19. A non-transitory computer-readable storage medium having embodied thereon a program, the program being executable by a processor to perform a method for allocating hosts in a network data distribution, the method comprising:
    evaluating backup viability criteria for a plurality of clients within a network;
    transmitting information regarding host responsibilities to a group of the clients that satisfy the backup viability criteria, wherein the host responsibilities are assigned to the group of clients to take over when communication with a current host regarding the host responsibilities is interrupted, wherein a different group of the clients is assigned different host responsibilities;
    allocating the host responsibilities within the group of clients, wherein allocating the host responsibilities includes identifying an order for performing the host responsibilities based on the evaluated backup viability criteria for the group of clients;
    detecting a new client in the plurality of clients based on periodic polling by a polling module;
    updating the group of clients assigned to the host responsibilities based on an evaluated backup viability of the new client, wherein the updated group of clients includes the new client; and
    reallocating host responsibilities within the updated group of clients, wherein reallocating the host responsibilities includes identifying a different order for performing the host responsibilities based on an evaluated backup viability criteria for the updated group of clients.

* * * * *